(12) United States Patent
Hidaka et al.

(10) Patent No.: US 6,934,118 B2
(45) Date of Patent: Aug. 23, 2005

(54) CAR DISK DRIVE UNIT (75) Inventors: Kenji Hidaka, Oumihachiman (JP); Hirokazu Noto, Moriyama (JP); Yasuo Takano, Nagaoka (JP); Katsushi Tanka, Oumihachiman (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 159 days.

(21) Appl. No.: 10/352,513

(22) Filed: Jan. 28, 2003

(65) Prior Publication Data

US 2003/0142439 A1 Jul. 31, 2003

(30) Foreign Application Priority Data

Jan. 29, 2002 (JP) ........................................ 2002-020563

(51) Int. Cl.⁷ ............................................... G11B 17/02
(52) U.S. Cl. ................................................. 360/97.02
(58) Field of Search ........................... 360/97.02, 97.03, 360/69

(56) References Cited

U.S. PATENT DOCUMENTS 6,385,007 B1 * 5/2002 Li ............................ 360/97.02

* cited by examiner

Primary Examiner—Robert S. Tupper
(74) Attorney, Agent, or Firm—Robert B. Martin; Dillon & Yudell LLP (57) ABSTRACT

To provide a car disk drive unit operating in a stable condition which is hardly affected by temperature changes in a vehicle, a car disk drive unit 1 of the present invention comprises: a casing 3 for accommodating a disk drive 2; a Peltier element 4 used as means for controlling the temperature being close to the upper surface of the casing 3 through an intermediate plate 18; a heat sink 5 being close to a base slice 50 on the lower surface of the Peltier element 4; an electric fan 6 for ventilating air to the heat sink 5; and a housing 11 for accommodating the casing 3 in the upper part as well as securing the heat sink 5 and the electric fan 6 to the lower part.

13 Claims, 7 Drawing Sheets

A-A Cross-section

FIG. 1 (a)

A-A Cross-section

B-B Cross-section of FIG. 3

<Temperature changes test in a constant temperature bath>
Temperature setting: 65°C

(Prior Art)

CAR DISK DRIVE UNIT

RELATED PATENT APPLICATION

This application claims the priority of Japanese Patent No. JP2002-20563 (IBM Docket No. JP920010403JP1), filed on Jan. 29, 2002, and entitled "Car Disk Drive Unit".

BACKGROUND OF THE INVENTION

1. Technical Field

The present invention relates to an external storage medium mounted on a vehicle including a passenger car, freight car, or an emergency car such as an ambulance car. More particularly, it relates to a car disk drive unit, such as a hard disk (HD) drive. In addition to a car disk drive unit carried in a car, it also relates to a car disk drive unit mounted on a vehicle, such as a train, a motorcycle, a vessel, an airplane or a disk drive unit mounted on a vending machine and a point-of-sale terminal located outdoor or an outdoor video recorder and the like.

2. Description of the Related Art

As information apparatuses including navigation systems, Electronic Toll Collection System (ETC), car automation or mobile apparatuses have become common, disk drives for reading and writing data associated with characters, audio, and video and the like to the hard disk, replacing conventional tapes or the like have been proposed as their external storage media. This aims for a reduction in access time and a tremendous increase in storage capacity in view of an increase in information content to affect the above-mentioned information apparatuses.

Figure 9:
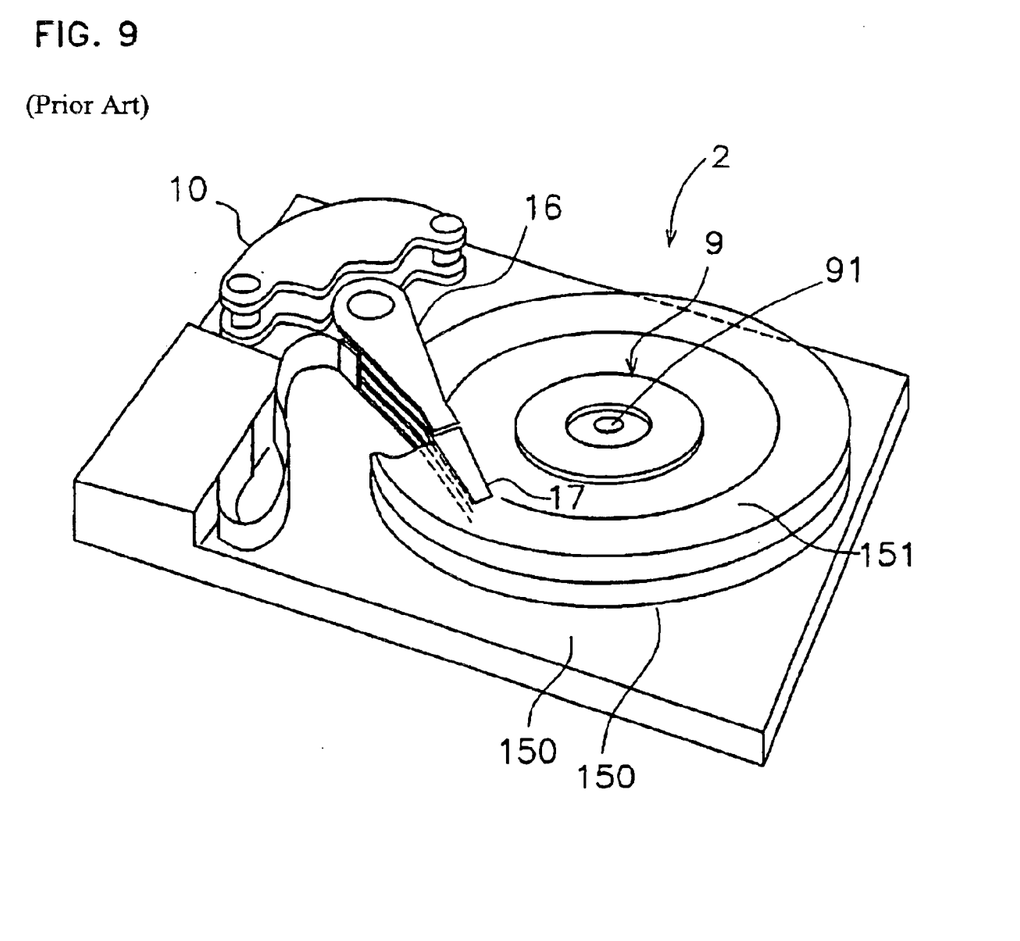
FIG. 9 is a perspective view for showing an internal constitution of a conventional HDD.

As shown in FIG. 9, a conventional hard disk drive (HDD) comprises a disk 150 wherein magnetic layers are formed; a spindle motor 9 for rotating the disk 150; a fluid lubricating bearing (not shown) for supporting a rotor 91 of the spindle motor 9; an actuator 10 disposed on one side of the disk 150; a swing arm 16 rotated by the actuator 10; and a magnetic head 17 which is in proximity to a track 151 of the disk 150.

The following problems arise when mounting a conventional HDD on a vehicle. More particularly, the temperature in a cabin and a trunk of a car may go down to −30° C. or lower in cold areas and in winter due to a profound effect exerted by the environment in the car. In warm areas and in summer, the temperature may go up to 60° C. or higher. When the temperature in a car goes down, an extreme increase in viscosity of a tightly sealed lubricant on the fluid lubricating bearing causes the addition of an excessive load to the spindle motor, which prevents the disk from rotating smoothly. As a result, a malfunction occurs on the disk drive.

Further, as the temperature in the car drops, dew condensation generates in the car. Particularly, electronic parts which comprise an HDD easily have dew condensation because of being made of metal materials with a low specific heat, which arises a problem of corrosion. This problem also arises when cooling in the car by starting an air conditioner in summer or the like.

Further, as the temperature in the car drops, dew condensation generates in the car. Particularly, electronic parts which comprise an HDD easily have dew condensation because of being made of metal materials with a low specific heat, which arises a problem of corrosion. This problem also arises when cooling in the car by starting an air conditioner in summer or the like.

This results in deterioration of physical properties of a lubricating film (oil film) to absorb or decrease vibrations from outside, so that the shaft of the disk 150 will shake by the vibrations caused by running of the car. If such vibrations become fiercer, the disk 150 will so vigorously swing to the degree that the magnetic head 17 is unable to write data or read data. Alternatively, the disk 150 and the magnetic head 17 may be destroyed by their collision.

Hard disks have been mainly described so far, but specific working proof temperatures of disk drive units, such as compact disks (CD) and DVD (Digital Video Disks) have been decided and there may be a problem that they cannot normally operate when being mounted on-vehicle in the above-mentioned environments.

It is an object of the present invention to provide a car disk drive unit operating in a stable condition which is hardly affected by temperature changes in a car.

SUMMARY OF THE INVENTION

A car disk drive unit according to the present invention comprises: a casing for accommodating a disk drive; and means for controlling the temperature provided in the casing.

Further, in the car disk drive unit according to the present invention, the temperature controlling means comprises: a Peltier element which is close to one surface of a casing; a heat sink which is close to another surface of the Peltier element; and an electric fan for ventilating to the heat sink.

In addition, in the disk drive unit according to the present invention, the temperature controlling means further comprises a heater for heating in the casing.

The disk drive unit according to the present invention further comprises: means for detecting the temperature in a casing; means for controlling an electric current respectively supplied to the disk drive, the temperature controlling means, and the electric fan based on a detection signal transmitted from the temperature detecting means.

The disk drive unit according to the present invention further comprises an air vent formed by penetrating a casing and a desiccating agent for dehumidifying in the casing located near to the air vent.

The disk drive unit according to the present invention further comprises a casing, means for controlling the temperature, a heat sink, and a housing for accommodating an electric fan.

In the disk drive unit according to the present invention, the inner surface of the housing is clad with a heat insulator encompassing the casing.

In the disk drive unit according to the present invention, a casing is supported by interposing an elastic material in a housing.

The disk drive unit according to the present invention connects a casing to means for controlling the temperature by joining a thermal conductive member made of a thermal conductive material.

According to a car disk drive unit of the present invention, stable operation is possible with being hardly affected by temperature changes in the car when mounting the disk drive unit on a passenger car or the like.

Even if the temperature in the car drops sharply, no dew condensation occurs on parts built in the disk drive unit.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF THE INVENTION

One embodiment of a car disk drive unit according to the present invention will be described in detail based on FIGS. 1 to 8. For known techniques, such as a disk drive 2, a spindle motor 9, and an actuator 10, detailed drawings are omitted by giving similar codes to a conventional example.

Figure 1:
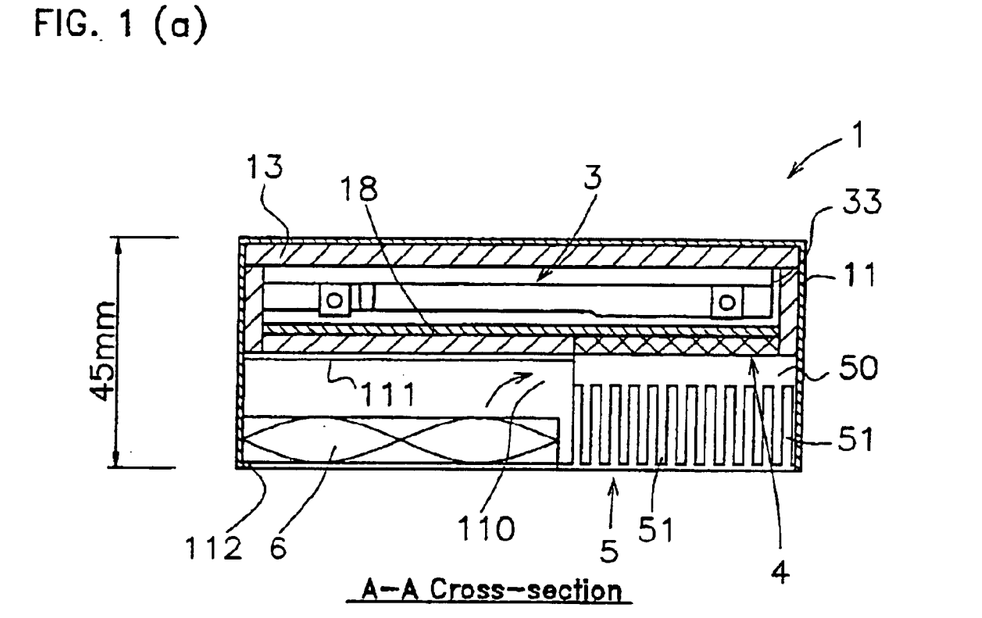
FIG. 1(a) is a longitudinal sectional view of a car disk drive unit according to a preferred embodiment of the present invention.
FIG. 1(b) is a transverse sectional view of the car disk drive unit.
Figure 2:
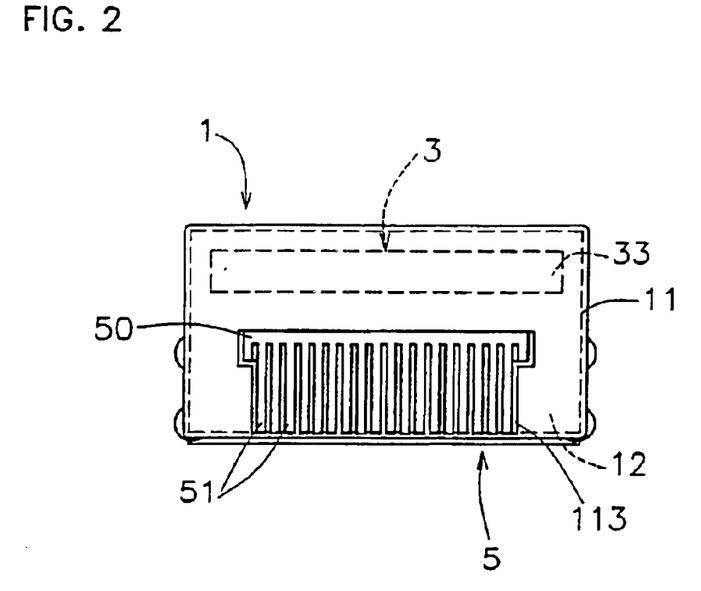
FIG. 2 is a horizontal sectional view of a car disk drive unit according to the preferred embodiment of the present invention.

As shown in FIGS. 1 and 2, a car disk drive unit 1 comprises: a casing 3 for accommodating a disk drive 2; a Peltier element 4 used as means for controlling the temperature which is close to the upper surface of the casing 3 through an intermediate plate 18; a heat sink 5 which is close to a base slice on the lower surface of the Peltier element 4; an electric fan 6 for ventilating air to the heat sink 5; and a housing 11 for accommodating the casing 3 in the upper part as well as securing the heat sink 5 and the electric fan 6 to the lower part.

Figure 3:
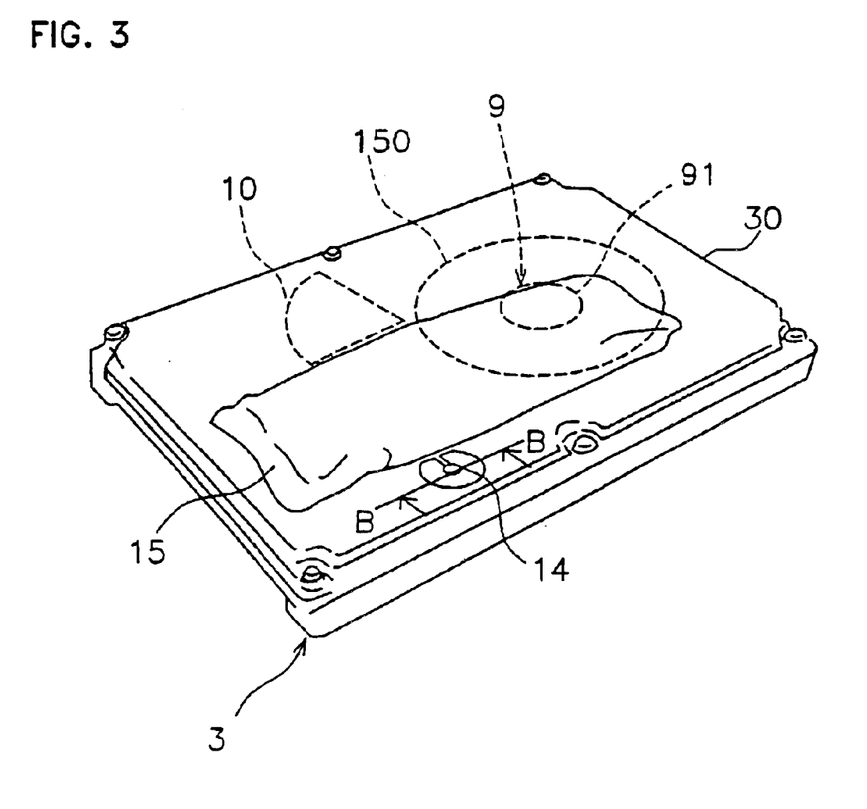
FIG. 3 is a perspective view of essential parts of a car disk drive unit according to the preferred embodiment of the present invention.

The casing 3 is a box in which the disk drive 2 is accommodated and the disk drive 2 is not shown in Figures. As shown in FIG. 3, the Peltier element 4 is disposed in a position to correspond to both of a spindle motor 9 of the disk drive 2 and an actuator 10 or in a position to correspond to either of the spindle motor 9 or the actuator 10. More specifically, FIG. 3 is a perspective view of the casing 3 seen from the upper surface of the casing 3, wherein portions respectively shown using break lines are the arrangement of the spindle motor 9 and the actuator 10 inside the casing 3. The spindle motor 9 is located near one end 33 of the casing 3. The Peltier element 4 is located right below the spindle motor 9 and the actuator 10. That is, the Peltier element 4 is located on the back side of the casing 3 in the condition shown in FIG. 1(a). It should be noted that FIG. 1(a) only shows the Peltier element 4 near the one end 33 of the casing 3.

The description about the configuration of the Peltier element 4 is omitted because of being well-known. The Peltier element 4 can heat or cool the disk drive 2 in the casing 3 according to the direction of an electric current provided by the control means which will be described later. When the use of the disk drive 2 is limited only in a cold area or in winter, an inexpensive heater made of electrically heated wires may be applied as temperature controlling means in replacement of the expensive Peltier element 4 due to no particular need for cooling the casing 3. In this case, an advantage of minimizing the entire manufacturing cost of the car disk drive unit 1 can be obtained. A heat pipe may be applied as heat transfer means.

As shown in FIG. 1, the inside of the housing 11 is divided by a partition panel 111. An air inlet 112, an air duct 110, and an outlet 113 are formed in the part lower than the partition panel 111 in the housing 11. The inlet 112 is changed to an outlet and the outlet 113 is changed to an inlet when reversing the flow direction of the electric fan 6. The outside dimensions of the housing 11 are set to height: 45 mm and width: 82 mm. The dimensions are allowable for installing a previously provided hanger for providing a radio and a CD player on the dashboard of a freight car.

As shown in the outline of FIGS. 1(a) and 1(b), the electric fan 6 is an axial fan, but a centrifugal fan (sirocco fan) may be applied. Upon startup of the electric fan 6, air outside the housing 11 is ventilated to the heat sink 5 through the air inlet 112 and the air duct 110 and then is discharged to the sides of the housing 11 from the air outlet 113. In this process, heat exchange occurs between the heat of the Peltier element 4 and air contacting the heat sink 5 by transmitting the heat of the Peltier element 4.

As well shown in FIGS. 1(a) and 2, the heat sink 5 is so configured wherein a group of cooling fins 51 are arranged lengthwise and crosswise on the lower surface of its base slice 50 and cooled air flows among a group of cooling fins 51. The heat sink 5 is made of a thermal conductive material capable of favorably conducting heat such as aluminum or copper or the like. Aluminum has advantages of being light and inexpensive. Copper is further excellent in thermal conductivity and these materials can be selected as properly according to uses and specifications.

The casing 3 performs the functions of protecting the disk drive 2 from dust or the like by separating the disk drive 2 to a certain degree. In view of effective discharge of heat generated in the disk drive 2 or remained inside the casing 3 to the Peltier element 4 and further to the heat sink 5, it is preferable that the whole or partial casing 3 is constructed by a thermal conductive material. This thermal conductive material is preferably suitable for the above-mentioned heat sink 5.

As shown in FIG. 1(a), the inner surface of the housing 11 is clad with a heat insulator 13 encompassing the casing 3. The heat insulator 13 is configured by adhering a plate having a thickness of about 5 mm made of expanded polyurethane or expanded styroll and the like to the outer periphery of the disk drive 2.

As shown in FIG. 3, inexpensive and easy-handling silica gel is employed as a desiccating agent 15 which may be placed close to the air vent 14 formed on the upper surface of the casing 3. FIG. 3 shows a condition that a bag made of breathable paper or the like packed with silica gel is placed close to the air vent 14. If air pressure in the casing 3 drops in this condition as the temperature in the casing 3 falls, outside air sucked from the air vent 14 will be dried by the touch to the desiccating agent 15.

Figure 4A:
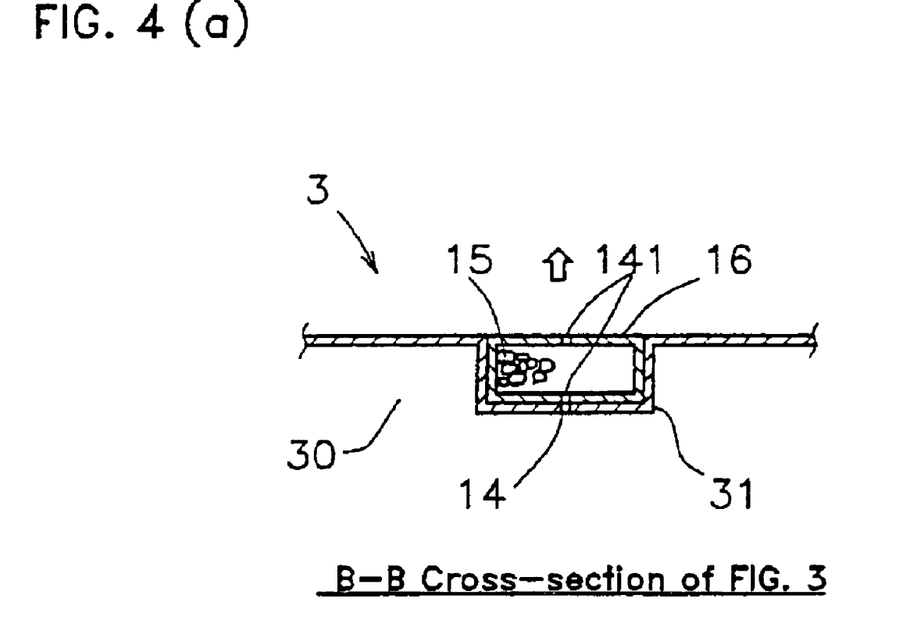
FIGS. 4(a) and 4(b) are respectively cross sectional views for showing operation of essential parts of a car disk drive unit according to the preferred embodiment of the present invention.
Figure 4B:
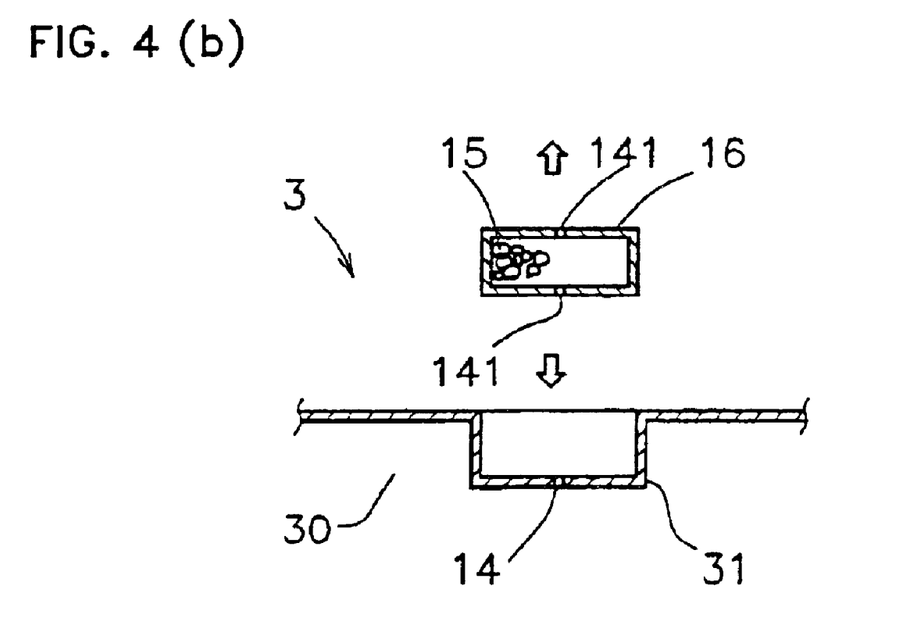

As shown in FIGS. 4(*a*) and 4(*b*), to insert the desiccating agent 15 into the casing 3, a pocket portion 31 is formed on the upper surface of the casing 3 by lowering the surrounding of the air vent 14 of the casing 3 by one stage-level and a cartridge 16 packed with the desiccating agent 15 may be charged into this pocket portion 31 which may be insertable into and removable from the pocket portion 31. The cartridge 16 has air vents 141 penetrating its top and bottom surfaces. On loading into the pocket portion 31, the whole cartridge 16 will be absorbed in the inside 30 of the casing 3, so that the air vent 14 of the casing 3 coincides to the air vents 141.

The above-mentioned description is not shown in Figures, but the car disk drive unit 1 comprises means for detecting the temperature in the casing 3 consisting of a temperature sensor or the like, means for controlling an electric current for supplying to the disk drive 2, the Peltier element 4, and the electric fan 6 based on a detection signal transmitted from this temperature detecting means. One of examples of controlling means includes a chip wherein a program for controlling the HDD is written.

According to these temperature detecting means and controlling means, it is possible to heat and cool the disk drive 2 with the Peltier element 4 and interrupt the supply of an electric current fed to the Peltier element 4, or start or stop the electric fan 6 so that the temperature in the casing 3 may be stabilized within the working guaranteed scope, if the working guaranteed scope for guaranteeing normal operation is defined within the scope between −5° C. and 55° C. As mentioned above, when a heater is applied in place of the Peltier element 4, it is natural to heat the disk drive 2, but it is possible to accelerate heat dissipation of the disk drive 2 using the heat sink 5 and the electric fan 6 together.

For example, in a cold area and in winter, even if the environment in the car, where the car disk drive unit 1 is mounted on, is not higher than −30° C., it is possible to heat the disk drive 2 with the Peltier element so that the temperature may be within the working guaranteed scope by supplying a predetermined electric current to the Peltier element 4 (or a heater).

Alternatively, even if the environment in the car, where the car disk drive unit 1 is mounted on, reaches not lower than 60° C. in a warm area or in summer, it is possible to cool the disk drive 2 with the Peltier element 4 so that the temperature may be within the working guaranteed scope by supplying an electric current of the electrode opposite to the above-mentioned electric current. Further, there is no possibility of heat remaining in the Peltier 4 because heat can be dissipated into the atmosphere through the heat sink 5. Furthermore, it is possible to accelerate heat dissipation from the heat sink 5 into the atmosphere by ventilating air to the heat sink 5 using the electric fan 6 as mentioned above, which leads further effective cooling.

Since it is possible to heat the disk drive 2 using the Peltier element 4 (or a heater), even if the environment in the car in a cold area or in winter is not higher than −30° C., the prevention of an increase in viscosity of a lubricant tightly sealed on a fluid lubricating bearing constituting the HDD enables to prevent the spindle motor constituting the HDD from being excessively loaded. This enables to retain smooth rotation of the disk.

In a warm area or in summer, even if the environment in the car reaches not less than 60° C., it is possible to cool the disk drive 2 using the Peltier element 4. In addition, there is no possibility of heat remaining in the Peltier 4 because of heat dissipation into air through the heat sink 5. It is possible to accelerate dissipation of heat into the atmosphere from the heat sink 5 by ventilating air to the heat sink 5 using the electric fan 6.

Accordingly, there is no sharp decrease in viscosity of the lubricant tightly sealed on the fluid lubricating bearing constituting the HDD, but the basic functions of the fluid lubricating bearing can be maintained. For example, it is possible to absorb or decrease vibrations from outside when the car is running. This effectively quells the shaking of the shaft of a disk 150 (see FIG. 9), so that there are no big vibrations to such an extent as to be unable to write or read data. The car disk drive unit 1 is capable of operating normally without any impact of ambient temperature changes.

In addition to such measures to stabilize the disk 150 itself, if the casing 3 is loosely connected to the housing 11 by joining an elastic material, it will be possible to surely prevent the disk drive unit 1 from having malfunction caused by the vibrations because of synergical working of these anti-vibration measures. In view of the principle and the structure of the disk drive 2, the installment of the disk drive 2 on a car wherein the temperature difference in cold and hot areas is originally dramatic and there are always big vibrations caused by running has been considered to be very difficult, but according to the disk drive unit 1 of the present invention, there is almost no possibility of the occurrence of imperfect working in the same manner as in the use under conditions of constant temperature and being close to be standstill, even if under the above-mentioned bad conditions.

More particularly, to connect the casing 3 to the housing 11 loosely, examples of the method include the application of an elastic material made of rubber or gel and the like as a seat of a screw (washer) to join both the casing 3 and the housing 11 in the portion where the casing 3 is secured to the housing 11 by screws. The natural frequency of the casing 3 loosely connected to the housing 11 changes according to the elastic coefficient which depends on the dimensions, shape, and material of this elastic material. Since the natural frequency is easily changed according to conditions such as whether the car disk drive unit 1 is mounted on a passenger car or a freight-car, or its running patterns, it is possible to further effectively remove vibrations for propagating to the casing 3 from the car.

Figure 5:
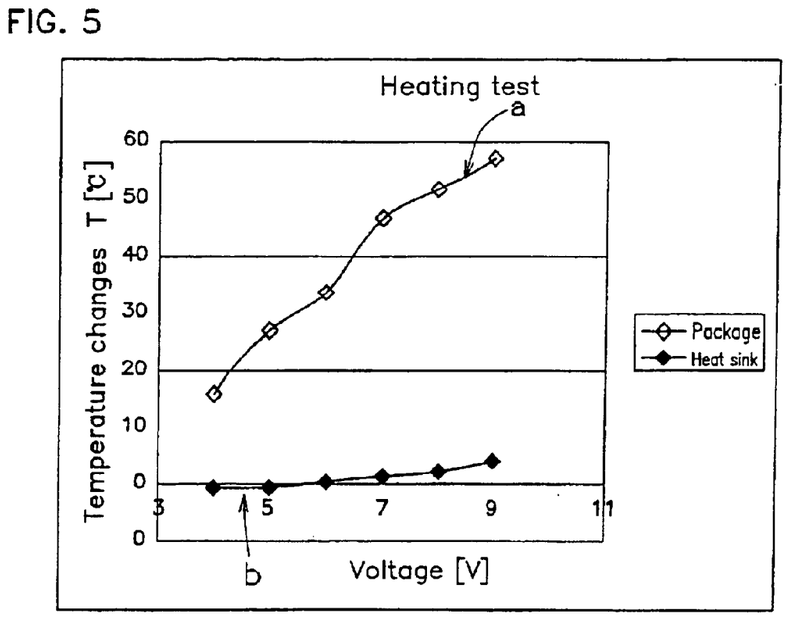
FIG. 5 shows a graph for the results of a performance test of a car disk drive unit under the low temperature environment according to the preferred embodiment of the present invention.
Figure 6:
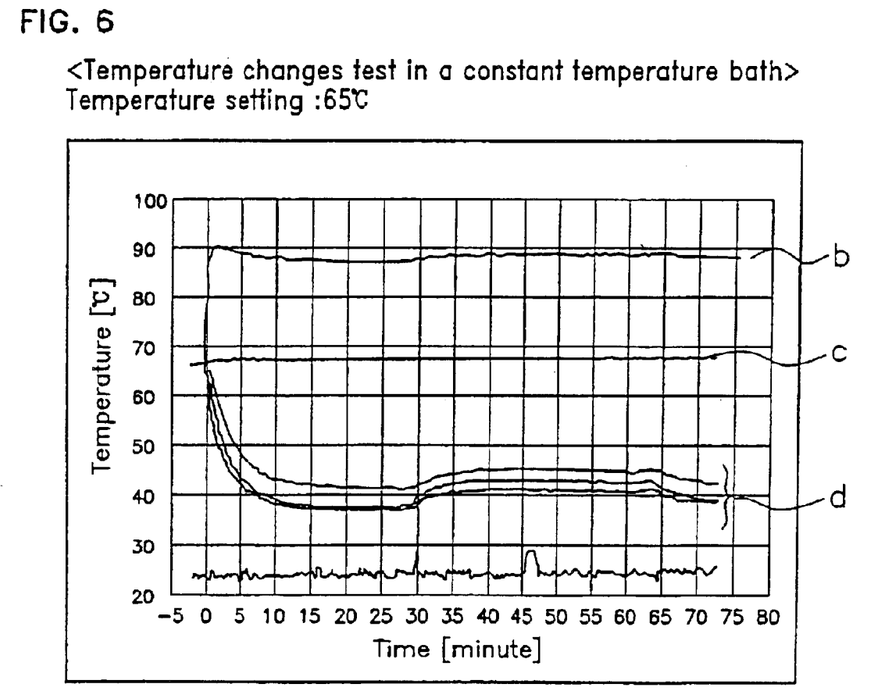
FIG. 6 shows a graph for the results of a performance test of a car disk drive unit under the high temperature environment according to the preferred embodiment of the present invention.

FIGS. 5 and 6 show respectively effects of the above-mentioned insulation control. FIG. 5 shows temperature changes in the casing 3 using a line a when placing the car disk drive unit 1 in a thermostatic chamber at about 0° C. A line b in FIG. 5 is obtained by measuring the temperature of the heat sink 5. While the temperature of the casing 3 increases when the voltage (horizontal shaft) applied to both terminals of the Peltier element 4 increases, it reveals that the temperature of the heat sink 5 is practically constant.

FIG. 6 shows the temperature changes in each portion of the casing 3 using three lines d and the temperature of the heat sink 5 using the line b when the car disk drive unit 1 is left in the thermostatic chamber at 65° C. (line c). As time goes by, it reveals that the temperature of each portion of the casing 3 is stable, reaching about 40° C. because of cooling effect of the Peltier element 4. On the other hand, heat exchange by the Peltier 4 is discharged into the heat sink 5, so that you can see the temperature of the heat sink 5 reaches close to 90° C.

As has been described in detail, in the car disk drive unit 1 according to the present invention, it is possible to control an electric current for supplying to the disk drive 2, the temperature control means (Peltier element 4 or a heater), and the electric fan 6 based on the temperature in the casing 3 detected by the temperature detecting means. Consequently, when the working guaranteed scope is defined, the temperature controlling means is capable of retaining heat of the disk drive 2 so that the temperature in the casing 3 may be constant within the working guaranteed scope, interrupting the supply of an electric current to the temperature controlling means or starting or stopping the electric fan 6.

When the temperature in the casing 3 exceeds beyond the above-mentioned working guaranteed scope, the disk drive 2 is compulsorily stopped by the interruption of supplying an electric current to the disk drive 2. This prevents out of spec operation which becomes a cause of the failure of the disk drive 2.

The spindle motor 9 and/or the actuator 10 can be cooled or heated using the Peltier element 4 because the Peltier element 4 is disposed in a position to affect the spindle motor 9 (see FIG. 9) and/or the actuator 10 (see FIG. 9) having comparatively a large heating value in the parts configuring the disk drive 2.

For this reason, even if the temperature in the casing 3 fluctuates, this fluctuation can be controlled in a rather short time to be stabilized. Particularly, the fluid lubricating bearing is located near the spindle motor 9, so that the fluid lubricating bearing can be heated or cooled with efficiency to surely maintain normal actuation of the car disk driver unit 1. Even when the temperature in the casing 3 is far beyond the working guaranteed scope, the car disk drive unit 1 can be actuated rapidly by heating or cooling the fluid lubricating bearing in a rather short time so that the disk drive unit 1 may be in ready condition.

Heat exchange can be efficiently performed between the interior of the casing 3 and the Peltier element 4 because the casing 3 is made of the above-mentioned thermal conductive material. A synergistic effect of cooling or heating by the Peltier element 4, the heat sink 5, and the electric fan 6 can be further promoted.

The disk drive 2 is hard to be directly susceptible to the impact from ambient temperatures and humidity because the disk drive 2 is accommodated in the housing 11.

It is possible to avoid the exposure of the heat sink 5 and the electric fan 6 because of accommodation of the heat sink 5 and the electric fan 6 inside the housing 11. Therefore, when the disk driver unit 1 is mounted on the dashboard of a passenger car and the like, the existing wiring in the dashboard gets snagged on the heat sink 5 and the electric fan 6, so that the disconnection can be prevented. In addition, there is no accumulation of dust or the like on the heat sink 5 and the electric fan 6.

Since the inner surface of the housing 11 is clad with the heat insulator 13 encompassing the casing 3, the effect of direct insusceptibility of the disk drive 2 to the ambient temperatures and humidity becomes more remarkable.

The heat insulator 13 is easy in molding processing at the time of production and its material costs can be cut to comparatively low because of being made of expanded polyurethane. The expanded polyurethane acts not only as a role of a buffer material, but also a sound deadening effect of not leaking outside the housing 11 by muffling working noise of the disk drive 2 can be obtained.

As mentioned above, the placement of the desiccating agent 15 near the air vent 14 formed by penetrating the casing 3 makes air sucked from the air vent 14 touch the desiccating agent 15 to be dried. This prevents dew condensation from occurring in the casing 3 because of always keeping air in the casing 3 dried, even if the temperature in the casing 3 sharply decreases due to a drop in temperature in a cold place and in winter or due to a drop in temperature caused by the use of an air conditioner or the like.

When the car disk drive unit 1 is mounted on the dashboard of a passenger car or the like, the desiccating agent 15 causes no trouble, such as running into other electric appliance like a radio and a CD drive unit because of being absorbed inside the casing 3.

Since the desiccating agent 15 is loaded into the casing 3 in a readily removable state, the desiccating agent 15 can be easily replaced when the moisture absorption of the desiccating agent 15 comes to its limits or the desiccating agent 15 gets deteriorated.

In addition, the desiccating agent 15 is easy to handle as well as being inexpensive because of using silica gel. It is also possible to freely load the desiccating agent 15 into the complicated narrow-spaced casing 3 because silica gel is granular.

The present invention has been described in detail so far, but the invention is not limited to these embodiments. Also, any modification, variations or equivalent arrangements which may occur to those skilled in the art should be considered to be within the scope of the invention.

Figure 7A:
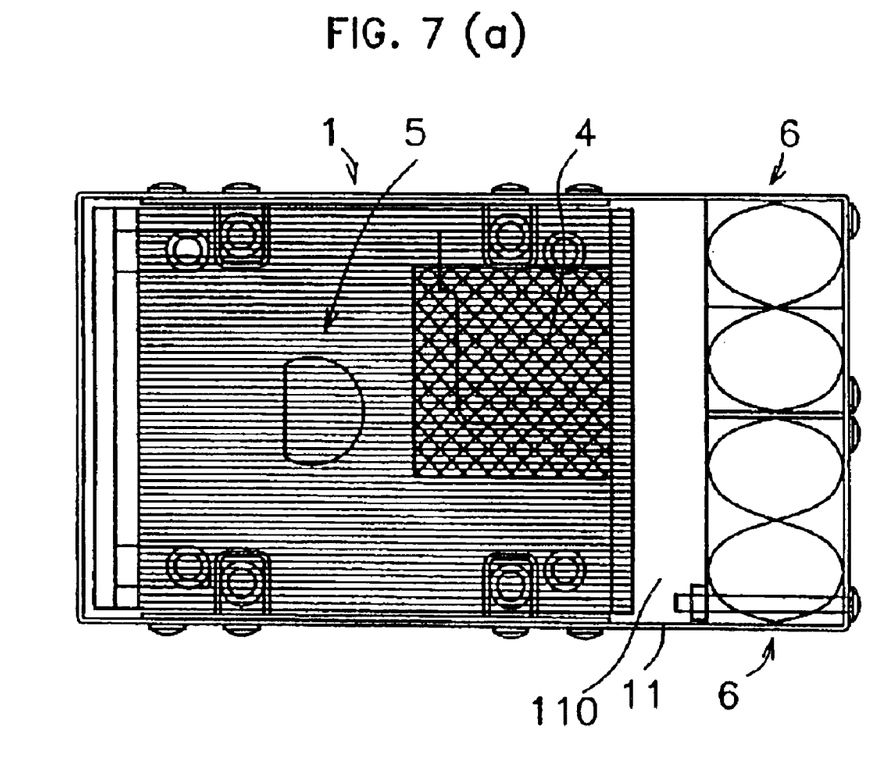
FIG. 7(a) is a longitudinal sectional view of one example of a modified car disk drive unit according to the preferred embodiment of the present invention.
Figure 7B:
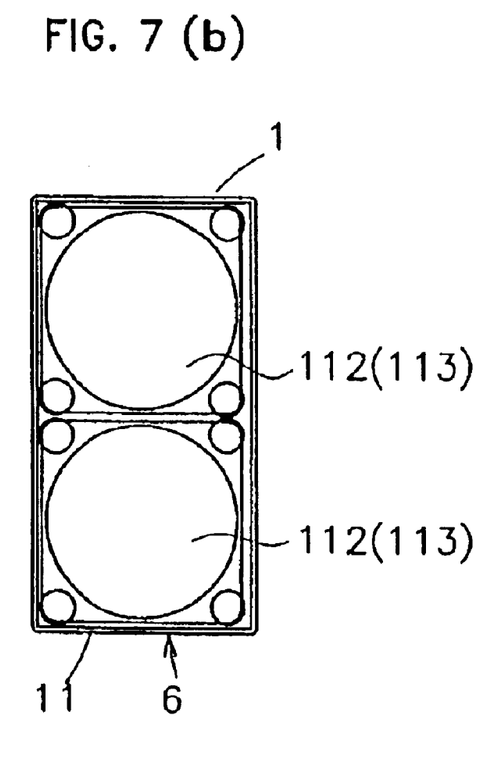
FIG. 7(b) is a transverse sectional view of the car disk drive unit.

As shown in FIGS. 7(a) and 7(b), in addition to two electric fans 6 on the sides of the heat sink 5, two inlets 112 or two outlets 113 may be provided on the sides of the housing 11. Whether the inlets 112 are used or the outlets 113 are used depends on the direction of rotation (ventilation) of the electric fans 6. If these electric fans 6 start simultaneously, the amount of air to be ventilated to the heat sink 5 will increase. If these two electric fans 6 stop or only one electric fan 6 starts by the above-mentioned control means, the heat release can be regulated according to the ambient temperature and the temperature in the casing 3.

Furthermore, upsizing the heat sink 5 further increases the heat release. That is, the heat sink 5 shown in FIGS. 7(a) and 7(b) is a large type entirely covering all area of the casing 3 (not shown in FIG. 7). FIG. 7(a) shows a status in which the casing 3 hides behind the heat sink 5. The partition with crosshatch in this figure shows an approximate location of the Peltier element 4.

Figure 8:
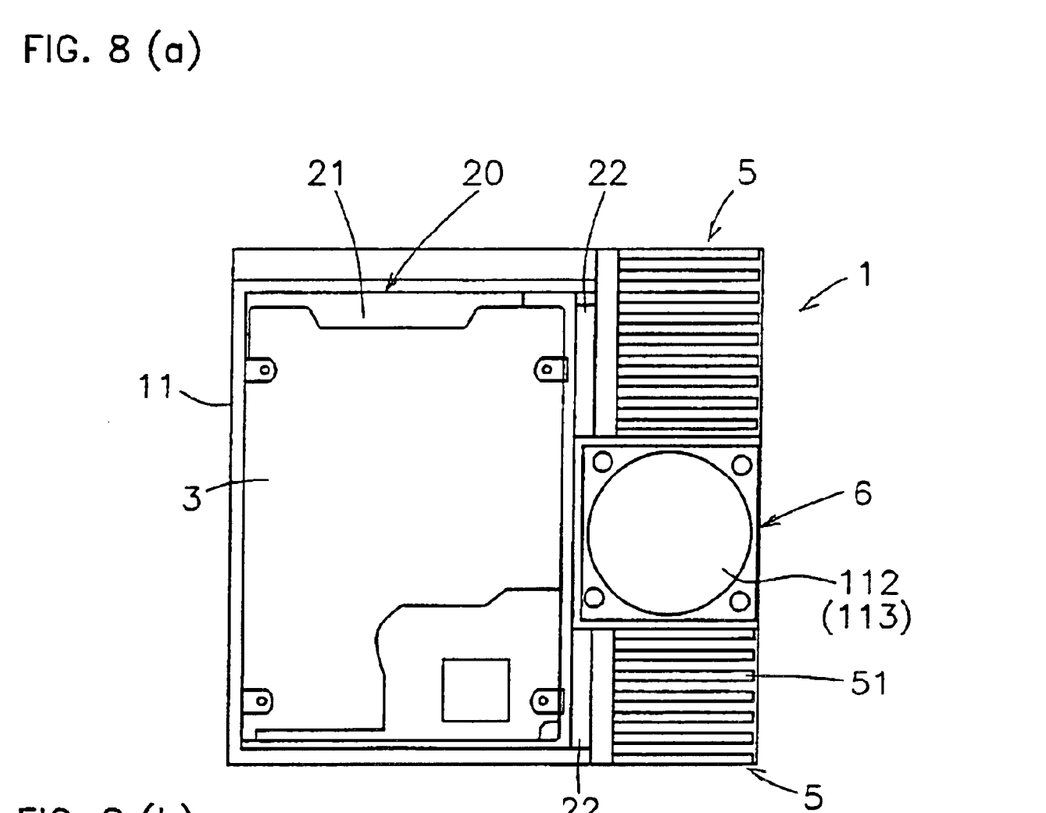
FIG. 8(a) is a longitudinal sectional view of another example of a modified car disk drive unit according to the preferred embodiment of the present invention.
FIG. 8(b) is a transverse sectional view of the modified car disk drive unit.

As shown in FIGS. 8(a) and 8(b), the casing 3 may be connected to the Peltier element 4 or the temperature controlling means, such as a heater through the thermal conductive member 20 made of the above-mentioned thermal conductive material. One of examples for the thermal conductive member 20 includes a horizontal part 21 touching the upper surface of the casing 3, unequal angle shaped fittings bent downward in a right end of the casing 3, which comprise vertical parts 22 touching the right side of the casing 3. If heat controlling means, such as the Peltier element 4 or a heater or the like is inserted in a vertical part 22 of the thermal conductive member 20, heat exchange between one surface of the comparatively large casing 3 and temperature controlling means can be efficiently performed, even if the temperature controlling means and heating sink 5 are disposed on the sides of the casing 3.

Thus, the heat release in the case of discharging heat of the casing 3 from the heat sink 5 is practically equal to the heat release in the case of directly connecting the heat sink 5 to one surface of the casing 3 as exemplified in FIG. 7(a). In addition, it is possible to make the outside shape of the car disk drive unit 1 thinner by minimizing the thickness of the housing 11 because of the location of the heat sink 5 and the electric fans 6 can be located on the sides of the casing 3

Such a configuration enables to set the outside dimensions of the housing 11 to a height of 22 mm and a width of 82 mm. When the thinned car disk drive unit 1 is mounted on the dashboard of a passenger car or the like, the disk drive unit 1 is accommodated into space of the dashboard by adjustment as well as other existing electric appliance, such as a radio located on the dashboard and the like.

There has thus been shown and described a novel car disk drive unit which fulfills all the objects and advantages sought therefor. Many changes, modifications, variations, combinations, and other uses and applications of the subject invention will, however, become apparent to those skilled in the art after considering this specification and accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A car disk drive unit comprising:
   a casing for accommodating a disk drive; and
   an assembly for controlling the temperature provided in the casing, comprising a Peltier element having one surface thereof adjacent to one surface of the casing, a heat sink adjacent to another surface of the Peltier element, and an electric fan for ventilating to the heat sink.

2. The disk drive unit of claim 1, wherein the temperature controlling assembly further comprises a heater for heating in the casing.

3. The disk drive unit of claim 1, further comprising means for detecting a temperature in the casing, and means for controlling an electric current respectively supplied to the disk drive, the temperature controlling assembly, and the electric fan based on a detection signal transmitted from the temperature detecting means.

4. The disk drive unit of claim 1, wherein the temperature controlling assembly is placed in a position to affect a spindle motor and an actuator of the disk drive.

5. The disk drive unit of claim 1, wherein the casing is made of a thermal conductive material.

6. The disk drive unit of claim 1, further comprising a housing for accommodating the casing, the temperature controlling assembly, the heat sink, and the electric fan.

7. The disk drive unit of claim 6, wherein an inner surface of the housing is clad with a heat insulator encompassing the casing.

8. The disk drive unit of claim 7, wherein the heat insulator is made of expanded polyurethane.

9. The disk drive unit of claim 1, further comprising an air vent formed by penetrating the casing and a desiccating agent for dehumidifying in the casing located near the air vent.

10. The disk drive unit of claim 9, wherein the casing has a pocket part for accommodating the desiccating agent where the desiccating agent is inserted.

11. The disk drive unit of claim 10, wherein the desiccating agent is insertable into and removable from the pocket part.

12. The disk drive unit of claim 6, wherein the casing is supported by interposing an elastic material in the housing.

13. The disk drive unit of claim 1, wherein the casing is connected to the temperature controlling assembly by joining a thermal conductive member made of a thermal conductive material there between.

* * * * *